May 1, 1928.
W. B. FAGEOL
1,668,196
SECTIONAL NUT FOR LUBRICATING DEVICES
Filed May 22, 1923
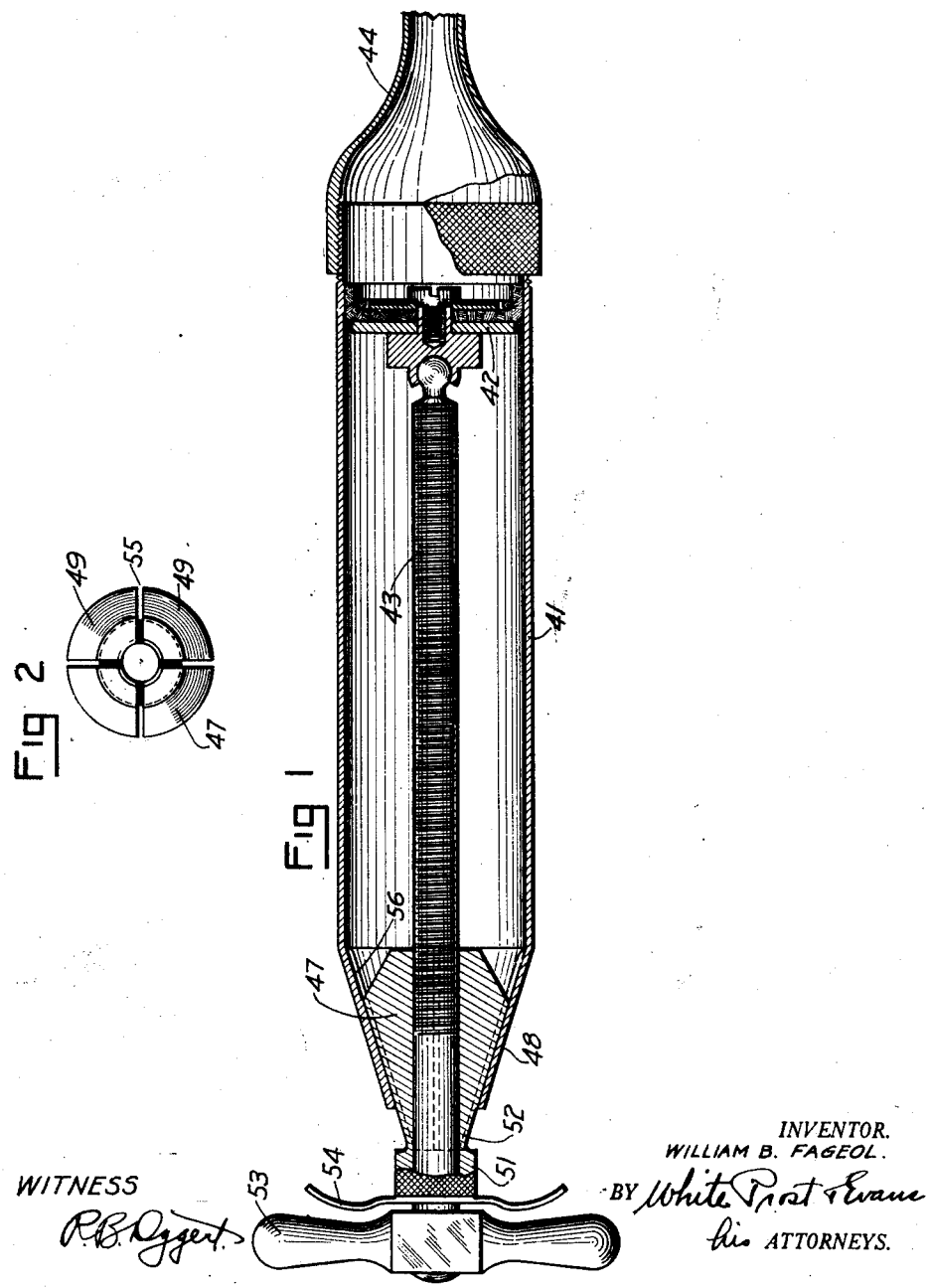
INVENTOR.
WILLIAM B. FAGEOL.

Patented May 1, 1928.

1,668,196

UNITED STATES PATENT OFFICE.

WILLIAM B. FAGEOL, OF OAKLAND, CALIFORNIA, ASSIGNOR TO ROLLIE B. FAGEOL, OF OAKLAND, CALIFORNIA.

SECTIONAL NUT FOR LUBRICATING DEVICES.

Application filed May 22, 1923. Serial No. 640,715.

This invention relates to lubricating devices and particularly pertains to a sectional nut for use in the operating parts of such structures.

It is the principal object of the present invention to provide a generally improved and simplified sectional nut for lubricating devices by means of which the piston in the lubricating device may be moved to discharge the lubricant under high pressure, but which nut is operative to release the stem of the piston so that the piston may be rapidly withdrawn.

One form which the invention may assume is exemplified in the following description and illustrated by way of example in the accompanying drawings, in which:—

Fig. 1 is a section through a lubricating device embodying my invention, in combination with a lubricant dispensing apparatus for filling the device with lubricant.

Fig. 2 is an end view of the multi-part nut forming part of the lubricant dispensing apparatus.

Reference being had to the accompanying drawings, in Fig. 1, I have shown a dispensing device comprising a cylinder 41 having a piston 42 therein which may be moved longitudinally by rotation of a jack screw 43. The cylinder 41 may be fitted with any suitable type of spout for discharging the lubricant therein. It is obvious that as the piston 42 is moved forwardly by rotation of the screw 43, its contents will be discharged from its discharge end.

Means are provided for permitting the rapid retraction of the piston for the purpose of refilling the cylinder 41 when the lubricant supply therein has been exhausted. By rapidly retracting the piston 42 a vacuum is produced below the piston and by inserting the cylinder 41 into the grease, retraction of the piston 42 will cause the grease to be sucked up into the cylinder 41, to fill it. The jack screw 43 engages in a four part nut 46 which is conical in shape and which fits into the conical end 48 of the cylinder 41. The four parts 49 of the nut 47 are connected to the head 51 by thin tongues 52. These tongues are resilient and continuously exert a force tending to separate the nut parts 49 to free them from the screw 43. The nut parts are held in engagement with the screw by the conical end 48 of the cylinder but by forcing the nut 47 inward it is freed from engagement with the conical end 48 and the nut parts are permitted to spread and free the screw. The screw may then be pulled back by the handle 53 to induce a charge of lubricant into the cylinder 41 and then the nut parts may be seated against the screw by pulling back on the handle 54, thus seating the nut in the conical end 48. The nut parts 49 are slightly spaced apart circumferentially, whereby grooves 55 are provided between the nut parts and the interior surface of the cone 48 is provided with ribs 56 which seat in these grooves and prevent the nut from turning. Any other suitable form of lubricant dispensing apparatus may be used however in connection with my invention.

While I have shown the preferred form of my invention, it is to be understood that various changes may be made in its construction by those skilled in the art without departing from the spirit of the invention, as defined in the appended claims.

I claim:

1. In a device of the character described including a cylindrical member having a frusto-conical end, an expansible nut mounted within said conical end of the cylindrical member and having a tapered outer periphery coinciding with the taper of said conical end, a jack screw threaded through said nut, a handle on the end of the screw to rotate the same, the tapered engagement between the tapered end of the cylindrical member and the nut normally maintaining the nut contracted into threaded engagement with the screw, means connecting the nut and said frusto-conical portion of the cylindrical member permitting the nut axial movement only, a handle on the end of the nut for moving the nut axially relative to the cylindrical member.

2. In a device of the character described including a cylindrical member having a frusto-conical end, a split nut mounted within said conical end, said nut comprising a head located exteriorly of the small end of said conical end of the cylindrical member, a tapered body portion mounted within said frusto-conical end of the cylindrical member and tapered to coincide with the interior surface thereof, said body portion being longitudinally divided whereby it may expand and contract, each section of the body portion being connected to said head by thin resilient tongues normally tending to expand the body portion, a jack screw threaded through said body portion of said nut, means connecting the nut and the conical portion of said cylindrical member permitting the nut axial movement only, the tapered engagement of the nut and cylindrical member normally maintaining the nut in threaded engagement with the screw, a handle connected with the head portion of the nut to move the same longitudinally with respect to the cylindrical member to expand and contract said nut.

3. A device of the character described including a cylindrical member having a tapered end, a jack screw projecting coaxially through the tapered end, a split expansible nut having a tapered outer periphery coinciding with said tapered end and mounted within the tapered end, said nut being adapted to threadedly engage said jack screw when contracted, means on the nut and within said tapered end for maintaining said nut non-rotatable, the tapered engagement between said tapered end and the nut normally maintaining said nut in threaded engagement with the jack screw, a transversely extending handle on the nut located exteriorly of said tapered end for moving said nut axially relative to the tapered end whereby the nut may expand and disengage from the jack screw, and spring means embodied in the nut normally tending to expand the same.

In testimony whereof, I have hereunto set my hand.

WILLIAM B. FAGEOL.